L. A. BEARDSLEY.
Hay Elevating Fork.
No. 29,948. Patented Sept. 11, 1860.
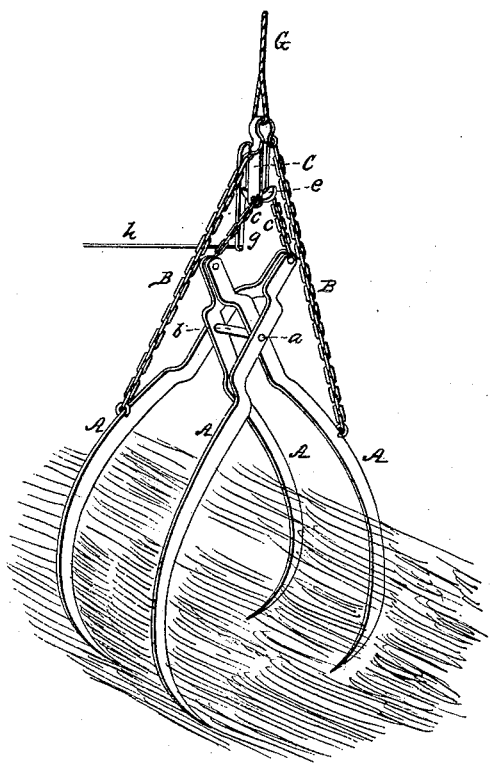
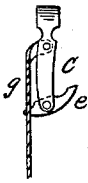
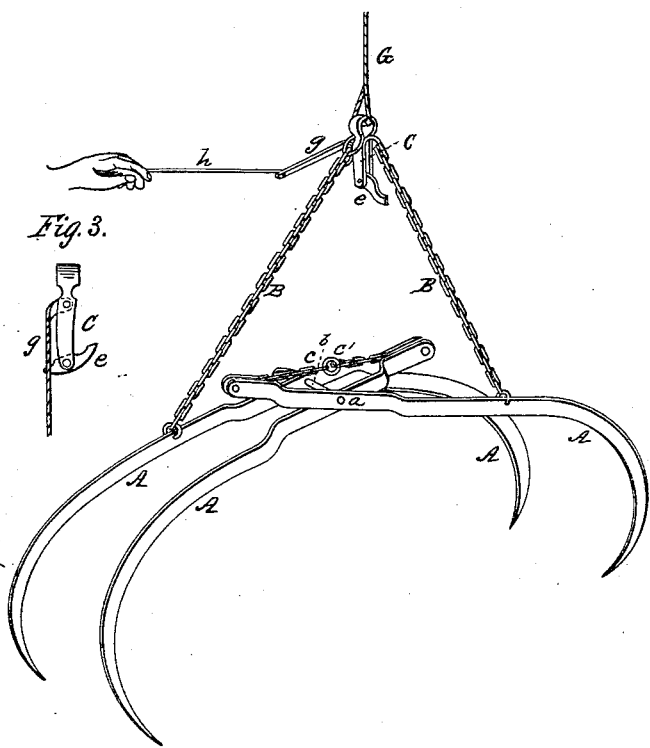
Witnesses:
Inventor:

UNITED STATES PATENT OFFICE.

LEVI A. BEARDSLEY, OF SOUTH EDMESTON, NEW YORK.

IMPROVEMENT IN HAY-ELEVATING FORKS.

Specification forming part of Letters Patent No. 29,948, dated September 11, 1860.

*To all whom it may concern:*

Be it known that I, L. A. BEARDSLEY, of South Edmeston, in the county of Otsego and State of New York, have invented a new and Improved Hay-Elevating Fork; and I do hereby declare that the following is a full, clear, and exact description thereof, reference being had to the accompanying drawings, making part of this specification, in which—

Figure 1 shows the elevating-hooks in operation grasping a bundle of hay. Fig 2 shows in a perspective view the elevating-tines in an open state when the hay has been discharged. Fig. 3 is a side view of the loop-tripping plate and latch of Figs. 1 and 2.

Similar letters of reference indicate corresponding parts in the figures.

This invention consists in constructing a device for elevating hay by a rope or chain and pulleys in such a manner that the bundle of hay to be elevated will be grasped tightly by four curved teeth, and held compactly by said teeth while it is being elevated, and when the hay is to be discharged a latch and chain are so applied to the teeth that by jerking a string attached to the latch the teeth will open and allow the bundle of hay to fall, as will be hereinafter described and represented.

To enable those skilled in the art to make and use my invention, I will proceed to describe its construction and operation.

In the drawings, A A A A are four curved tines that are riveted together at their tops in pairs, and each pair are bent so that they will be spread some distance apart, as represented in the drawings. The two pairs of curved tines are jointed together at $a$ by a rod, $b$, passing across from each pair, and the two riveted ends above their fulcrum are connected together by a short chain, $c$, having a ring, $c'$, linked to it. This chain is of a sufficient length to allow the tines to separate, as in Fig. 2, and by raising the hooks A by this chain $c$ they will close up, as shown in Fig. 1.

B B are two chains that are attached to one of each pair of tines A, which, being of a suitable length, are attached to a latch-loop, C, Fig. 3, between which is pivoted a hooked latch, $e$, (shown clearly in Fig. 3,) one end of which passes through a hole in a jointed tripping-plate, $g$. The pulley-rope G is connected to to the loop C, and a cord, $h$, is attached to the piece $g$. The office of the chains or cords B B is to open the hooks, while that of the chain $c$ is to close them.

From this description it will be seen that by placing the tines over a mass of hay and hooking the ring $c'$ of the chain $c$ on the hooked portion of latch $e$, when this latch is held by the piece $g$, and drawing on the pulley-rope G, the tines A will be drawn together and grasp and compress the hay in a bundle, when it may be elevated by drawing on the pulley-rope G. (Shown in Fig. 1.) Then when it is desired to drop the hay free from the tines, by pulling on cord $h$, the latch will be tripped and the chain $c$ will allow the chains B B to open the tines, as shown in Fig. 2, thus discharging the hay from them.

Having thus described my invention, what I claim as new, and desire to secure by Letters Patent, is—

The gang-forks A A, jointed together as set forth, with the chains $c$ and B B attached to them, in combination with the tripping-latch $e$, tripping-plate $g$, and loop C, arranged and operating substantially in the manner and for the purposes herein set forth.

LEVI A. BEARDSLEY.

Witnesses:
PERRY WARREN,
D. W. MATTESON.